US009998739B2

United States Patent
Chon et al.

(10) Patent No.: US 9,998,739 B2
(45) Date of Patent: Jun. 12, 2018

(54) OPTIMIZATION FOR ENCODING VIDEO DATA USING NON-SQUARE PARTITIONS

(71) Applicant: QUALCOMM Incorporated, San Diego, CA (US)

(72) Inventors: Jaehong Chon, San Diego, CA (US); In Suk Chong, San Diego, CA (US); Wei-Jung Chien, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 15/060,273

(22) Filed: Mar. 3, 2016

(65) Prior Publication Data

US 2016/0261886 A1 Sep. 8, 2016

Related U.S. Application Data

(60) Provisional application No. 62/129,650, filed on Mar. 6, 2015.

(51) Int. Cl.
*H04N 7/12* (2006.01)
*G06K 9/46* (2006.01)
*H04N 19/139* (2014.01)
*H04N 19/119* (2014.01)
*H04N 19/176* (2014.01)
(Continued)

(52) U.S. Cl.
CPC ......... *H04N 19/139* (2014.11); *H04N 19/107* (2014.11); *H04N 19/119* (2014.11); *H04N 19/147* (2014.11); *H04N 19/176* (2014.11); *H04N 19/513* (2014.11); *H04N 19/103* (2014.11); *H04N 19/19* (2014.11); *H04N 19/61* (2014.11)

(58) Field of Classification Search
CPC .. H04N 19/593; H04N 19/119; H04N 19/423; H04N 19/70
See application file for complete search history.

(56) References Cited

U.S. PATENT DOCUMENTS 9,247,247 B2 * 1/2016 Min ................. H04N 19/50
9,706,204 B2 * 7/2017 Song .................... H04N 19/159
(Continued)

OTHER PUBLICATIONS

Reduce HEVC Complexity, IEICE Transactions on Fundamentals of Electronics, Communications and Computer Sciences, Engineering Sciences Society, Tokyo, JP, vol. E95A, No. 7, Jul. 1, 2012 (Jul. 1, 2012), pp. 1215-1218, XP001576171, ISSN: 0916-8508*

(Continued)

*Primary Examiner* — Tsion B Owens
(74) *Attorney, Agent, or Firm* — Shumaker & Sieffert, P.A.

(57) ABSTRACT

To encode video data, a video encoder partitions a 2N×2N block of video data into four N×N blocks, determines encoding modes for each of the four N×N blocks, calculates values representative of encoded versions of the four N×N blocks using the encoding modes for each of the four N×N blocks, determines whether to skip testing of at least one non-square partitioning mode for the 2N×2N block based on the calculated values, and encodes the 2N×2N block based at least in part on the determination of whether to skip testing of the at least one non-square partitioning mode.

30 Claims, 7 Drawing Sheets

(51) Int. Cl.
*H04N 19/147* (2014.01)
*H04N 19/513* (2014.01)
*H04N 19/107* (2014.01)
*H04N 19/61* (2014.01)
*H04N 19/103* (2014.01)
*H04N 19/19* (2014.01)

(56) References Cited

U.S. PATENT DOCUMENTS

| | | | | |
|---|---|---|---|---|
| 2008/0117976 | A1* | 5/2008 | Lu | H04N 19/139 375/240.16 |
| 2012/0121011 | A1* | 5/2012 | Coban | H04N 19/176 375/240.03 |
| 2012/0230417 | A1* | 9/2012 | Sole Rojals | H04N 19/00109 375/240.18 |
| 2014/0003530 | A1* | 1/2014 | Sole Rojals | H04N 19/129 375/240.18 |
| 2014/0010292 | A1* | 1/2014 | Rapaka | H04N 19/176 375/240.12 |
| 2015/0016521 | A1* | 1/2015 | Peng | H04N 19/00569 375/240.12 |

OTHER PUBLICATIONS

Reduce HEVC Complexity, IEICE Transactions on Fundamentals of Electronics,Communications and Computer Sciences, Engineering Sciences Society, Tokyo, JP, vol. E95A, No. 7, Jul. 1, 2012 (Jul. 1, 2012), pp. 1215-1218, XP001576171,ISSN: 0916-8508.*

International Preliminary Report on Patentability from International Application No. PCT/US2016/020926, dated May 18, 2017, 22 pp.

Gweon, et al., "Early Termination of CU Encoding to Reduce HEVC Complexity", MPEG meeting, Jul. 14-22, 2011, Torino, (Motion Picture Expert Group or ISO/IEC JTC1/SC29/WG11), No. m20456, Jul. 12, 2011; 4 pp.

Gweon, et al., "Early Termination of CU Encoding to Reduce HEVC Complexity", IEICE Transactions On Fundamentals Of Electronics, Communications and Computer Sciences, Engineering Sciences Society, Tokyo, JP, vol. E95A, No. 7, Jul. 2012, pp. 1215-1218.

International Search Report and Written Opinion from International Application No. PCT/US2016/020926, dated May 13, 2016, 12 pp.

Sullivan, et al., "Overview of the High Efficiency Video Coding (HEVC) Standard", IEEE Transactions on Circuits and Systems for Video Technology, Sep. 28, 2012, 19 pp.

Tian, et al., "Content Adaptive Prediction Unit Size Decision Algorithm for HEVC Intra Coding," 2012 Picture Coding Symposium (PCS 2012) : Krakow, Poland, May 7-9, 2012 ; [Proceedings], IEEE, Piscataway, NJ, pp. 405-408.

Response to Written Opinion dated May 13, 2016, from international application No. PCT/US2016/020926, filed Jul. 21, 2016, 4 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.223, Series H: Audiovisual and Multimedia Systems, Infrastructure of audiovisual services—Transmission multiplexing and synchronization, Multiplexing protocol for low bit rate multimedia communication, The International Telecommunication Union. Jul. 2001, 74 pp.

\* cited by examiner

| 101A MV1/RD1 Cost1 | 101B MV2/RD2 Cost2 |
| 101C MV3/RD3 Cost3 | 101D MV4/RD4 Cost4 |

OPTIMIZATION FOR ENCODING VIDEO DATA USING NON-SQUARE PARTITIONS

This disclosure claims the benefit of U.S. Provisional Patent Application 62/129,650 filed 6 Mar. 2015, the entire content of which is hereby incorporated by reference.

TECHNICAL FIELD

This disclosure relates to video encoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques for encoding video data and, more particularly, to various methods for non-square block (e.g. prediction unit) encoding. For some coding scenarios, non-square prediction units may produce coding gains, such as improved rate-distortion tradeoff or improved compression, compared to square prediction units. The complexity of testing the non-square prediction units, however, may dramatically increase encoder-side complexity. This disclosure introduces techniques to reduce the computing complexity associated with encoding video data using non-square blocks, while still maintaining a majority of the coding efficiency achieved from non-square blocks.

In one example, a method of encoding video data includes partitioning a 2N×2N block of video data into four N×N blocks, wherein N is an integer value; determining encoding modes for each of the four N×N blocks; calculating values representative of encoded versions of the four N×N blocks using the encoding modes for each of the four N×N blocks; determining whether to skip testing of at least one non-square partitioning mode for the 2N×2N block based on the calculated values; and encoding the 2N×2N block based at least in part on the determination of whether to skip testing of the at least one non-square partitioning mode.

In another example, a device for encoding video data includes a memory configured to store the video data and one or more processors configured to partition a 2N×2N block of video data into four N×N blocks, wherein N is an integer value; determine encoding modes for each of the four N×N blocks; calculate values representative of encoded versions of the four N×N blocks using the encoding modes for each of the four N×N blocks; determine whether to skip testing of at least one non-square partitioning mode for the 2N×2N block based on the calculated values; and encode the 2N×2N block based at least in part on the determination of whether to skip testing of the at least one non-square partitioning mode.

In another example, an apparatus for encoding video data includes means for partitioning a 2N×2N block of video data into four N×N blocks, wherein N is an integer value; means for determining encoding modes for each of the four N×N blocks; means for calculating values representative of encoded versions of the four N×N blocks using the encoding modes for each of the four N×N blocks; means for determining whether to skip testing of at least one non-square partitioning mode for the 2N×2N block based on the calculated values; and means for encoding the 2N×2N block based at least in part on the determination of whether to skip testing of the at least one non-square partitioning mode.

In another example, a computer-readable storage medium storing instructions that when executed by one or more processors cause the one or more processors to partition a 2N×2N block of video data into four N×N blocks, wherein N is an integer value; determine encoding modes for each of the four N×N blocks; calculate values representative of encoded versions of the four N×N blocks using the encoding modes for each of the four N×N blocks; determine whether to skip testing of at least one non-square partitioning mode for the 2N×2N block based on the calculated values; and encode the 2N×2N block based at least in part on the determination of whether to skip testing of the at least one non-square partitioning mode.

The details of one or more embodiments of this disclosure are set forth in the accompanying drawings and the description below. Other features, objects, and advantages of this disclosure will be apparent from the description and drawings, and from the claim

BRIEF DESCRIPTION OF DRAWINGS

FIG. 2 shows an example of four N×N partitions that may be used for determining difference values in accordance with the techniques of this disclosure.

DETAILED DESCRIPTION

This disclosure is directed to techniques for encoding video data and, more particularly, to various methods for rectangular block (e.g. prediction unit) encoding. For some coding scenarios, rectangular prediction units may produce coding gains, such as improved rate-distortion tradeoff or improved compression, compared to square prediction units. The complexity of testing the rectangular prediction units, however, may dramatically increase encoder-side complexity. For example, for a hypothetical high efficiency video coding (HEVC) video encoder, using non-square coding modes in addition to square coding modes has been estimated to be upwards of four-times more complex than using only square prediction units.

This disclosure introduces techniques to reduce the complexity associated with using rectangular PUs in video compression techniques such as HEVC, while still maintaining a majority of the coding efficiency achieved from rectangular PUs. As will be explained in greater detail below, according to the techniques of this disclosure, a video encoder may selectively check rectangular PU modes and selectively skip checking rectangular PU modes depending on information determined for other modes (e.g. square PU modes). In this context, checking a rectangular partition mode refers to testing an encoding hypothesis that includes the rectangular partition mode.

Figure 1:
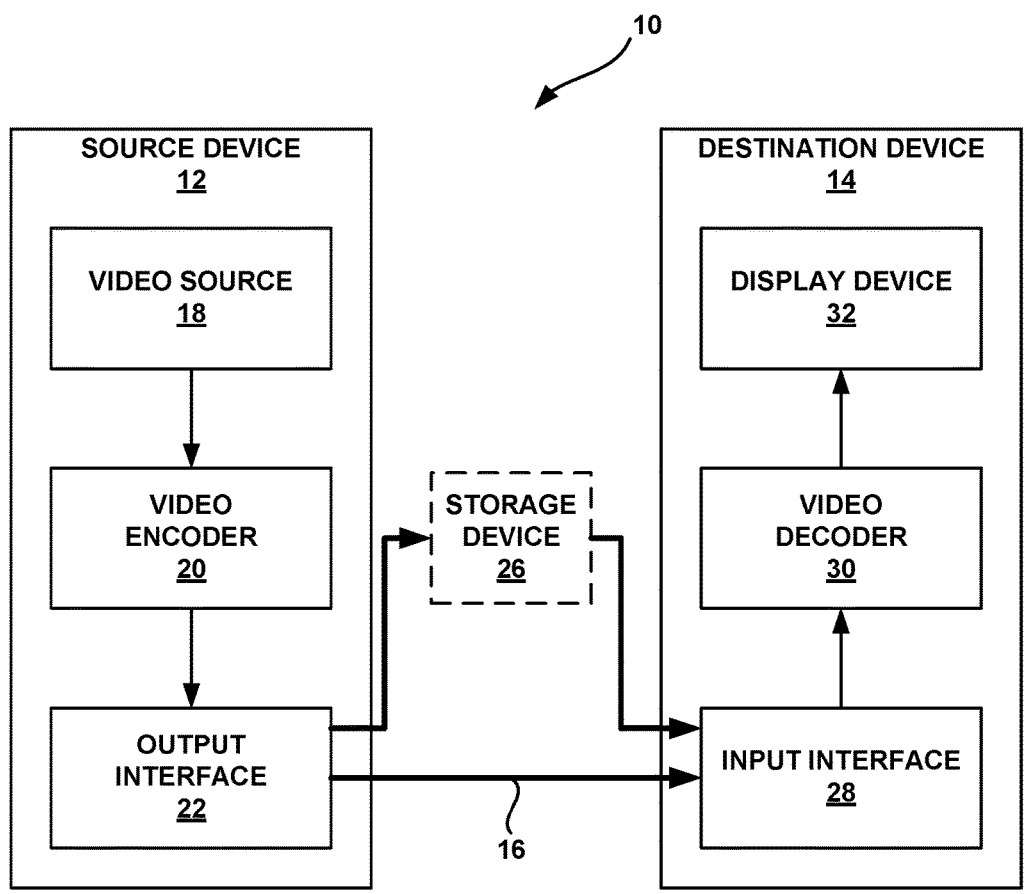
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video encoding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video encoding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples, where N may be equal to an integer such as 16, 32, or 64. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be a 2N×2N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may determine whether to encode a block an intra-prediction block or an inter-prediction block at the CU level, where a variety of PU partitioning schemes may be used. As an example, HEVC supports prediction in PU sizes from 64×64 down to 4×4 samples. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RB SP for supplemental enhancement information (SEI) messages, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

To take advantage of the tools defined in HEVC for better coding efficiency, an HEVC encoder, such as video encoder 20, may become very complex. For example, to encode an LCU, video encoder 20 may need to check (e.g. test encoding hypotheses for) many different CU sizes to that range, for example, from 8×8, 16×16 up to 64×64. For each CU size, there are also different partition modes (or PU shapes) to check, such as 2N×2N, 2N×N, and N×2N, etc.

Among the partition modes, 2N×N and N×2N are commonly referred to as rectangular partition modes; although, in this context, rectangular is generally understood to mean non-square and to exclude square partition modes. With two PUs involved, checking a 2N×N mode including motion estimation and rate-distortion optimization is usually about twice as complex as checking the 2N×2N mode. The same is also true for checking the N×2N mode. As a result, checking these two modes in addition to the 2N×2N mode may incur an extra four-times the complexity.

In many typical video encoder implementations, rectangular PU modes may be less desirable compared to square PU modes due to lack of methods to efficiently reduce the complexity associated with the rectangular modes. This complexity associated with rectangular modes may be particularly undesirable for real-time or near-real-time applications that require video to be encoded quickly.

This disclosure introduces various techniques that may reduce the complexity associated with encoding video data using rectangular PU modes, while maintaining the majority of the coding efficiency achieved from using rectangular modes. Although not limited to HEVC, the techniques of this disclosure may of particular benefit when encoding video using the HEVC standard.

According to example techniques of this disclosure, video encoder 20 may be configured to not check rectangular PU modes for every CU. Instead, rectangular PU modes may be checked conditionally depending on the cost (e.g., RD cost) of other modes. For a given CU size, after checking the 2N×2N mode, video encoder 20 may further check the RD (rate-distortion) cost of four quarter-sized blocks associated with an N×N mode (which is roughly equal to checking a 2N×2N mode with four quarter-sized CUs). Depending on the RD-cost relationship between a 2N×2N mode and an N×N mode, rectangular PU modes may be selectively checked.

For example, if the total RD cost of four blocks at N×N level is higher than that of the block at 2N×2N level, it is unlikely that splitting the 2N×2N block into smaller block partitions improves coding efficiency. In this case, video encoder 20 may skip checking the rectangular PU modes (e.g., 2N×N mode and N×2N mode).

According to techniques of this disclosure, when video encoder 20 determines to check the rectangular partition modes, some additional conditions may be used to decide whether it is enough to simply check one of the two rectangular partition modes (i.e., either 2N×N or N×2N). More specifically, in one example, such a decision may be based on four N×N block RD-cost information values.

FIG. 2 shows an example of four N×N partitions (labeled 101A, 101B, 101C, and 101D) that may be used for determining difference values in accordance with equations 1-4 below. FIG. 2 shows an example of a 2N×2N block partitioned into 4 N×N blocks. Two values of horizontal difference and vertical difference can be derived from the four N×N blocks of FIG. 2. The difference values may be motion vector difference values and/or RD cost difference values. If the vertical difference (e.g., as calculated by equation 2 below) is higher than horizontal difference (e.g., as calculated by equation 1 below), then the N×2N mode may have a higher possibility of being chosen than 2N×N mode, so only the N×2N partition mode is checked, and vice versa. Only when the vertical and horizontal differences are close, both 2N×N and N×2N are checked.

When a 2N×2N block is partitioned into four N×N blocks, for example, video encoder 20 may determine motion vectors for each of the N×N blocks using a motion estimation process, as described in more detail below. Video encoder 20 may compare a horizontal difference value (H) and a vertical difference value (V) determined from the motion vector information to determine how close each N×N block is to a horizontal neighboring block and to a vertical neighboring block, using equations 1 and 2 below.

$$H = abs(MV1 - MV2) + abs(MV3 - MV4) \quad (1)$$

$$V = abs(MV1 - MV3) + abs(MV2 - MV4) \quad (2)$$

The motion vector subtraction of equations 1 and 2 may, for example, be determined by determining a difference between the x-component of a first motion vector and the x-component of a second motion vector, and by determining the difference between the y-component of a first motion vector and the y-component of a second motion vector. If, two neighboring square N×N partitions have similar motion vectors (e.g., a small difference between motion vectors), then it may be efficient to encode those two partitions together as a single, rectangular partition with one motion vector. Conversely, if two neighboring square N×N partitions have substantially different motion vectors (e.g., a relatively large difference between motion vectors), then it may be undesirable to encode those two partitions together as a single, rectangular partition with one motion vector Thus, a smaller difference of motion vectors in two N×Ns may typically show the higher possibility for using a rectangular shape partition. If H is lower than V, then only a horizontal shape (2N×N) may be checked, and vice versa.

Instead of motion vector differences as shown in equations 1 and 2, a horizontal difference value (H) and a vertical difference value (V) may also be determined based on costs (e.g., RD cost or distortion) associated with encoding each N×N partition. Distortion analysis generally determines an amount of distortion (or error) between an encoded block and an original, unencoded block that was encoded to produce the encoded block. Rate-distortion analysis likewise generally determines an amount of distortion (or error) between an encoded block and an original, unencoded block that was encoded to produce the encoded block, but further takes into consideration a bit rate (that is, a number of bits) used to produce the encoded block. Numerous techniques for quantifying distortion, such as mean-squared-error (MSE) analysis and activity-weighted MSE, are known. Similarly, numerous techniques for measuring a rate-distortion cost, such Lagrangian-cost analysis, are known. The techniques of this disclosure are not limited to any particular techniques for determining distortion metrics or rate-distortion metrics.

When the cost is considered, H and V are derived similarly, as shown with equations (3) and (4) below.

$$H = abs((Cost1+Cost2)-(Cost3+Cost4)) \quad (3)$$

$$V = abs((Cost1+Cost3)-(Cost2+Cost4)) \quad (4)$$

As the bigger difference of the cost in two N×Ns shows the higher possibility to use the rectangular shape, if H is higher than V, horizontal shape (2N×N) is only checked, and vice versa.

The closeness for the difference explained above may be defined with β. For example, if β is 1.05, then if the difference is less than 5%, both 2N×N and N×2N will be checked.

Overall, the techniques of this disclosure may reduce the complexity for rectangular PU coding by approximately 60% with little loss of coding efficiency.

Figure 3A:
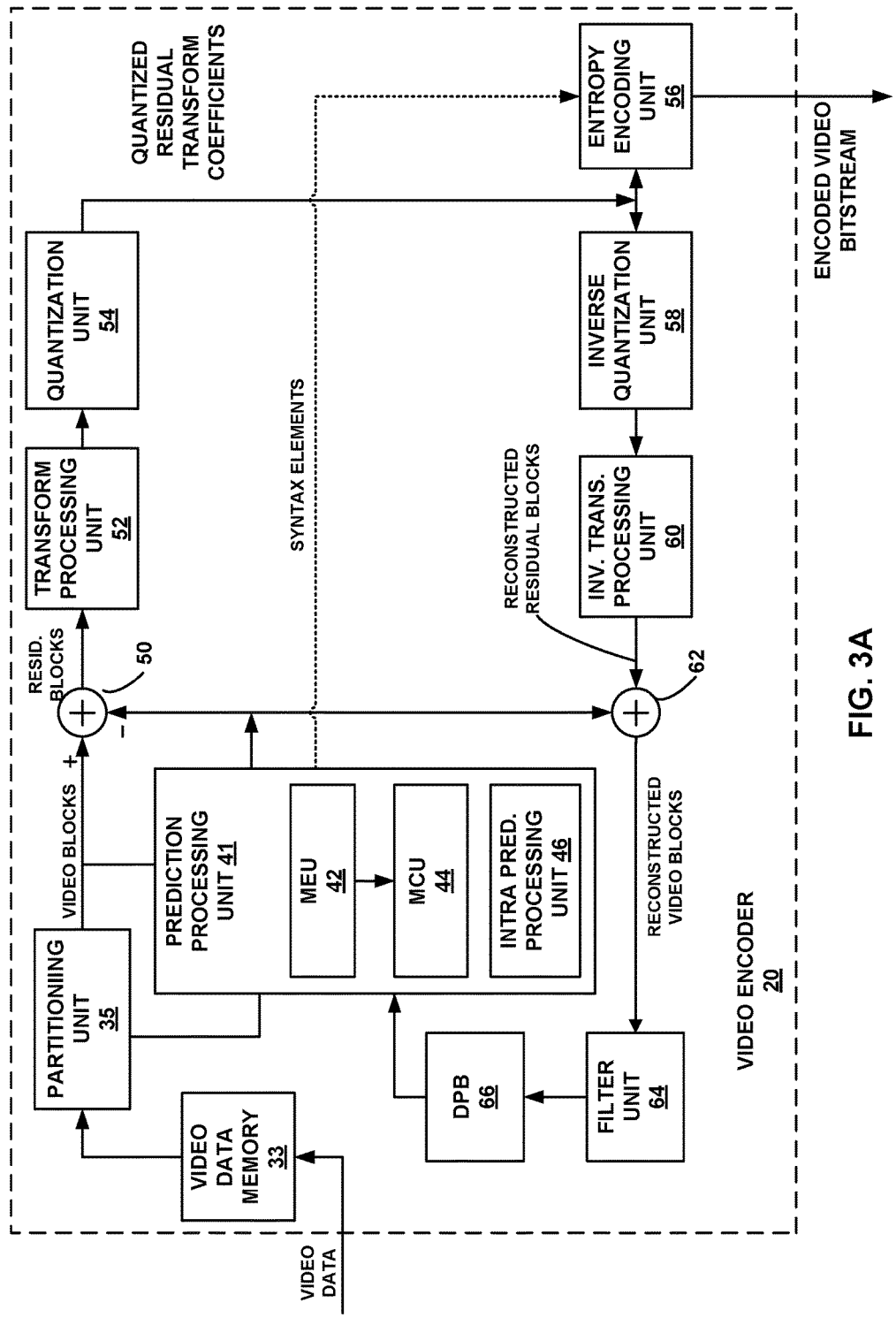
FIG. 3A is a block diagram illustrating an example video encoder that may implement the techniques described in this disclosure.

FIG. 3A is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3A, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 3A, video encoder 20 receives video data and stores the received video data in video data memory 33. Video data memory 33 may store video data to be encoded by the components of video encoder 20. The video data stored in video data memory 33 may be obtained, for example, from video source 18 in FIG. 1. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRA\4), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. Partitioning unit 35 may, for example, determine partitions of the video data according to the techniques described above and elsewhere in this disclosure. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may apply one or more of deblocking filtering, sample adaptive offset (SAO) filtering, adaptive loop filtering (ALF), or other types of loop filtering. Filter unit 64 may apply deblocking filtering to filter block boundaries to remove blockiness artifacts from reconstructed video and may apply other types of filtering to improve overall coding quality. Additional loop filters (in loop or post loop) may also be used.

Figure 3B:
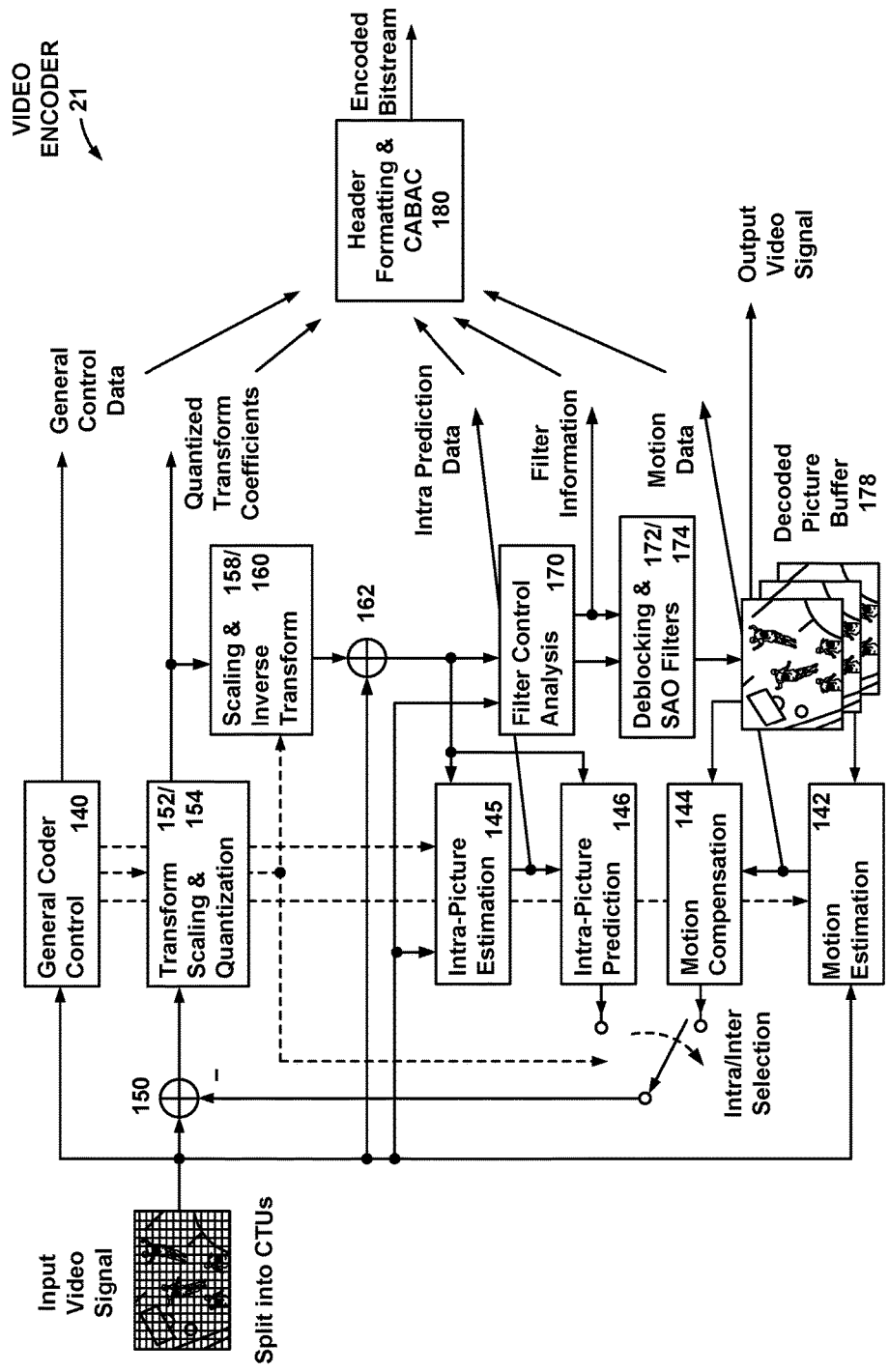
FIG. 3B is a block diagram illustrating an example video encoder that may implement the techniques described in this disclosure.

FIG. 3B is a block diagram illustrating an example video encoder 21 that may implement the techniques described in this disclosure. FIG. 3B represents an example HEVC video encoder configured to perform the techniques of this disclosure. Video encoder 20 of FIG. 3A and video encoder 21 of FIG. 3B are not necessarily intended to be alternate video encoders, but instead may considered to be alternative views of the same video encoder. Thus, features described with respect to video encoder 20 may be implemented in video encoder 21 and vice versa.

Video encoder 21 includes general coder control unit 140, motion estimation unit 142, motion compensation unit 144, intra-picture estimation unit 145, intra-picture prediction processing unit 146, transform scaling and quantization unit 152/154, scaling and inverse transform unit 158/160, filter control analysis unit 170, deblocking and SAO filters 172/174, decoded picture buffer 178, and header formatting and CABAC unit 180. Each of these components generally performs the same functions as its like numbered equivalent in FIG. 3A. For example, motion estimation unit 142 generally performs the same functionality as motion estimation unit 42 in FIG. 3A, and transform scaling and quantization unit 152/154 generally performs the same functionality as transform processing unit 52 and quantization unit 54.

General coder control unit 140 selects and maintains various parameters for how video encoder 21 is to encode video data. For example, general coder control unit 140 may select the profiles, tiers, and levels of the HEVC standard to which the video data is to be coded in accordance with. General coder control unit 140 may also, for example, establish and maintain the bitrate and desired RD levels.

Video encoder 21 partitions an input video signal into video blocks (e.g. CTUs) and sends those CTUs to motion estimation unit 142 and intra-picture estimation unit 145. Motion estimation unit 142 may be configured to determine an inter-prediction mode for a block of video according to a predetermined pattern for a video sequence. Intra-picture estimation unit 145 may be configured to determine an intra prediction mode for the block of video data. Video encoder 21 selects one of the intra prediction mode or the inter prediction mode for coding the block of video data. The selected intra prediction data or motion data is sent to header formatting and CABAC unit 180, which may entropy encode the data for inclusion in the encoded bitstream.

At summer 150, video encoder 21 determines residual data by subtracting a predicted block, identified using the determined motion data or intra prediction data, from an original block. Transform, scaling, and quantization unit 152/154 transforms the residual video data into residual transform coefficients using a transform, such as a DCT or a conceptually similar transform and may convert the residual video data from a pixel domain to a transform domain, such as a frequency domain. Transform, scaling, and quantization unit 152/154 also quantizes the transform coefficients to further compress the data. The quantization process may reduce the bit depth associated with some or all of the coefficients. Transform, scaling, and quantization unit 152/154 sends the quantized transform coefficients to header formatting and CABAC unit 180, which may entropy encode the quantized transform coefficients for inclusion in the encoded bitstream.

Video encoder 21 may also include a decoding loop for determining the quality of video encoding achieved for various encoding hypotheses. In the decoding loop, scaling and inverse transform unit 158/160 applies inverse quantization and inverse transformation to reconstruct the residual block in the pixel domain. Summer 162 adds the reconstructed residual block to the predicted block found by either intra-picture prediction processing unit 146 of motion compensation unit 144 to determine a reconstructed block.

Filter control analysis unit 170 determines the filter information, including any SAO information, to be used for filtering the reconstructed blocks. Filter control analysis unit 170 sends the determined filter information to header formatting and CABAC unit 180, which may entropy encode the filter information for inclusion in the encoded bitstream. Deblocking and SAO filters 172/174 may also apply one or more filters, based on the filter information determined by filter control analysis unit 170, to the reconstructed block in order to remove blockiness artifacts and otherwise improve the video quality. As part of performing multiple coding passes, filter control analysis unit 170 may derive multiple different sets of filter information, and deblocking and SAO filters 172/174 may filter reconstructed blocks using the derived filter information as part of determining which filter information of the different sets of filter information to use for coding the blocks.

Prior to storage in DPB 178, deblocking and SAO filters 172/174 may filter the reconstructed block using the determined filter information. Thus, when coding future blocks of video data, intra-picture estimation unit 145 and motion estimation unit 142 may search for predictive blocks in the filtered, reconstructed blocks, which are the same blocks a video decoder uses for locating predictive blocks.

Figure 4:
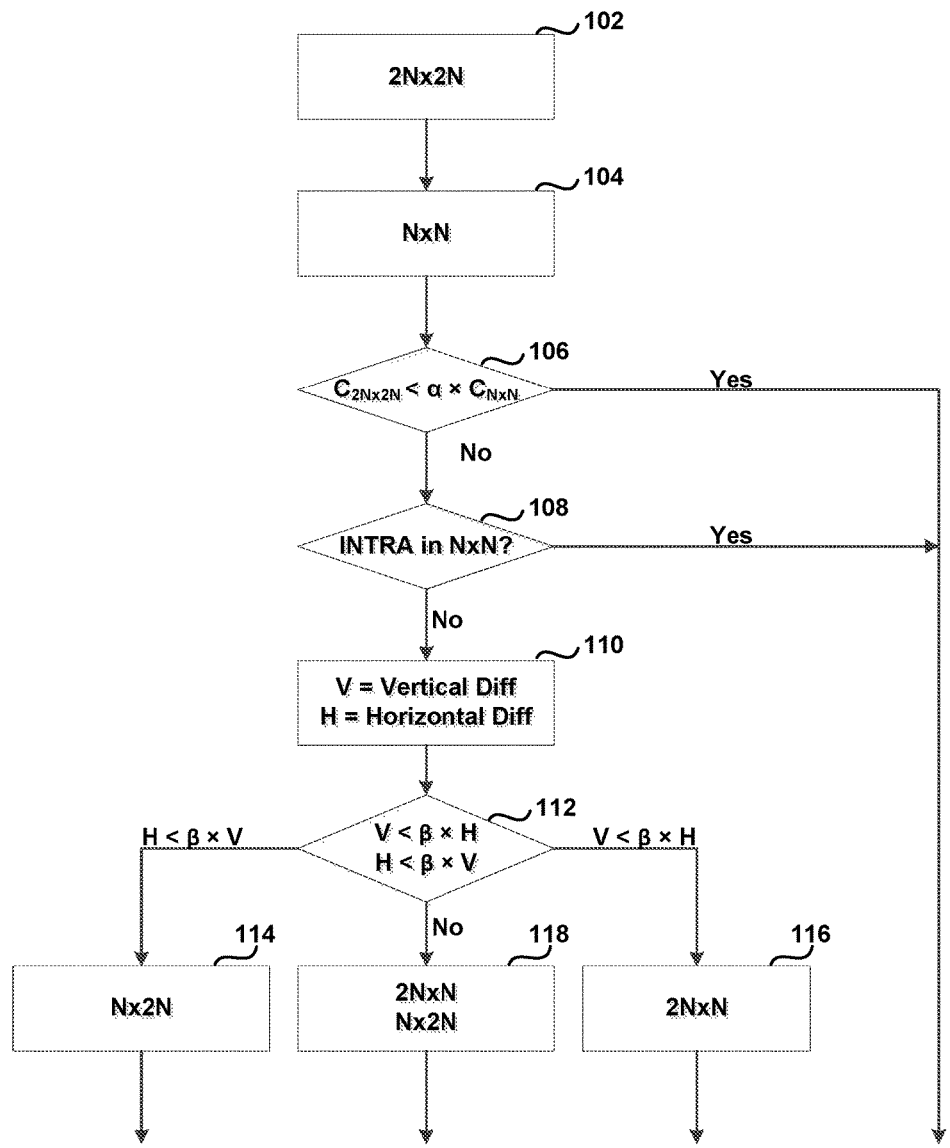
FIG. 4 shows a flowchart illustrating techniques for rectangular PU optimization in accordance with aspects of this disclosure.

FIG. 4 shows a flowchart illustrating techniques for rectangular PU optimization in accordance with aspects of this disclosure. The techniques of FIG. 4 will be described with respect to a generic video encoder, which may correspond to either video encoders 20 and 21, combine characteristics of both video encoders 20 and 21, and/or be different than video encoder 20 and 21. The techniques of FIG. 4 are not limited to any particular type of video encoder. Furthermore, although the techniques of FIG. 4 are described with respect to an RD cost, it should be understood that the techniques of FIG. 4 may be implemented using a cost other than an RD cost, implemented using motion vector differences, or implemented using combinations of multiple types of costs or combinations of costs and motion vector differences.

In accordance with the techniques of FIG. 4, a video encoder is configured to determine a first rate-distortion (RD) cost associated with encoding a block of video data in a first square partition mode (102) and determine a second RD cost associated with encoding the block of video data in a second square partition mode (104), where the second square partition mode implements smaller square partitions than the first square partition mode. In the example of FIG. 4, the first square partition mode is a 2N×2N mode, and the second square partition mode is an N×N partition mode. The second RD cost may correlate to a total RD cost associated with four N×N blocks. The second RD cost for 4 N×N blocks may be determined, for example, by summing the distortion and signaling costs for the 4 N×N blocks. The second RD cost is another way to measure an RD cost of the 2N×2N block (split into 4 N×N blocks), which may provide an indication of whether or not splitting the 2N×2N block into two 2N×N blocks or two N×2N blocks will produce coding gains.

The video encoder may compare the first RD cost (shown as $C_{2N\times 2N}$ in FIG. 4) to the second RD cost (shown as $C_{N\times N}$ in FIG. 4) (106), and in response to the second RD cost being greater than the first RD cost by a threshold amount (106, YES), the video coder may terminate a partition mode determination process. The threshold amount (shown as a in FIG. 4) may, for example, be set equal to 1.1, 1.05, 0.95, 0.9, or some other such value. The value a may affect the frequency with which the video encoder selects the 2N×2N partition mode. The video encoder may terminate the partition mode determination process by skipping a checking of rectangular partition modes. In response to the second RD cost being greater than the first RD cost by the threshold amount (106, YES), the video encoder may select the first square partition mode (2N×2N in the example of FIG. 4) to encode the block.

In response to the first RD cost being greater than the second RD cost by a second threshold amount (106, NO), the video encoder may check additional partition modes. As part of checking additional partition modes, if the video encoder determines at least one of the blocks is to be coded in an intra mode for N×N (108, YES), then video encoder may terminate the partition mode determination process and encode the 2N×2N block using four N×N partitions. If the video encoder determines all of the blocks are not to be coded in an intra mode for N×N (108, NO), then the video encoder determines a horizontal difference associated with partitions of the second square partition mode and determines a vertical difference associated with partitions of the second square partition mode (110). To determine the horizontal difference associated with partitions of the second square partition mode, the video encoder may determine differences between motion vectors according to equation 1 above and/or determine differences between RD costs according to equation 3 above. To determine the vertical difference associated with partitions of the second square partition mode, video encoder may determine differences between motion vectors according to equation 2 above and/or determine differences between RD costs according to equation 4 above.

To determine the horizontal difference associated with the partitions of the second square partition mode, the video encoder may determine a difference (e.g. a cost difference or a motion vector difference) between a top-left partition and a top-right partition and a difference between a bottom-left partition and a bottom-right partition. To determine the vertical difference associated with the partitions of the second square partition mode, the video encoder may determine a difference between top-left partition and a bottom-left partition and a difference between a top-right partition and a bottom-right partition.

In response to the horizontal difference being less than the vertical difference by a threshold amount (112, H<β*V), the video encoder may check a vertical rectangular (e.g., N×2N) (114) partition mode for the block without checking a horizontal rectangular partition mode (e.g., 2N×N). In response to the vertical difference being less than the horizontal difference by a threshold amount (112, v<β*H), the video encoder may check a vertical rectangular partition mode (e.g., 2N×N) (116) for the block without checking a horizontal rectangular partition mode for the block (e.g., N×2N). In response to the vertical difference being within a threshold amount of the horizontal difference (112, NO), the video encoder may check both a vertical rectangular partition mode for the block and a horizontal rectangular partition mode for the block (118).

It should be understood that for steps 114, 116, and 118 in FIG. 4 that just because the rectangular partition modes are checked does not necessarily mean that the block is ultimately encoded using a rectangular partition mode. Following step 114, for example, the block may still be encoded using square partition modes (e.g., 2N×2N or N×N) after checking the N×2N partition modes. Similarly, following step 116, for example, the block may still be encoded using square partition modes (e.g., 2N×2N or N×N) after checking the 2N×N partition modes, and following step 118 the block may still be encoded using square partition modes (e.g., 2N×2N or N×N) after checking both the 2N×N and N×2N partition modes.

It should also be understood that step 108 may be removed when applying the techniques of FIG. 4 to video compression standards other than HEVC. As HEVC does not support rectangular partitions for intra coded blocks, an HEVC encoder does not need to test rectangular partitions mode after determining a partition is to intra encoded. For a different video compression standard that supports intra encoded rectangular partitions, the video encoder may continue to step 110 even after determining that one or more partitions of the 2N×2N block is to be intra encoded.

In accordance with the techniques described above, video encoders 20 and 21 represent examples of video encoders configured to partition a 2N×2N block of video data into four N×N blocks and determining encoding modes for each of the four N×N blocks. Video encoders 20 and 21 may then calculate values representative of encoded versions of the four N×N blocks using the encoding modes for each of the four N×N blocks and determine whether to skip testing of at least one rectangular partitioning mode for the 2N×2N block based on the calculated values. Video encoders 20 and 21 may encoding the 2N×2N block based at least in part on the determination of whether to skip testing of the at least one rectangular partitioning mode.

Video encoders 20 and 21 may determine whether to skip testing by determining a horizontal value from the values representative of the encoded versions of the four N×N blocks, determining a vertical value from the values representative of the encoded versions of the four N×N blocks, determining whether to skip testing of the at least one rectangular partitioning mode based on whether the horizontal value is larger than the vertical value multiplied by an offset or whether the vertical value is larger than the horizontal value multiplied by the offset. Video encoders 20 and 21 may determine whether to skip testing by determining to skip testing an N×2N partitioning mode when the horizontal value is larger than the vertical value multiplied by the offset. Video encoders 20 and 21 may also determine whether to skip testing by determining to skip testing a 2N×N partitioning mode when the vertical value is larger than the horizontal value multiplied by the offset.

Video encoders 20 and 21 may calculate the values by calculating motion vector difference values for motion vectors of the four N×N blocks, with each of the motion vector difference values including a respective horizontal component and a respective vertical component. Video encoders 20 and 21 may determine the horizontal value by calculating the sum of a first difference between the horizontal component of the motion vector for an upper-left block of the four N×N blocks and the horizontal component of the motion vector for a lower-left block of the four N×N blocks and a second difference between the horizontal component of the motion vector for a lower-left block of the four N×N blocks and the horizontal component of the motion vector for a lower-right block of the four N×N blocks. Video encoders 20 and 21 may determine the horizontal value by calculating the sum of a first difference between the horizontal component of the motion vector for an upper-left block of the four N×N blocks and the horizontal component of the motion vector for an upper-right block of the four N×N blocks and a second difference between the horizontal component of the motion vector for a lower-left block of the four N×N blocks and the horizontal component of the motion vector for a lower-right block of the four N×N blocks.

Figure 5:
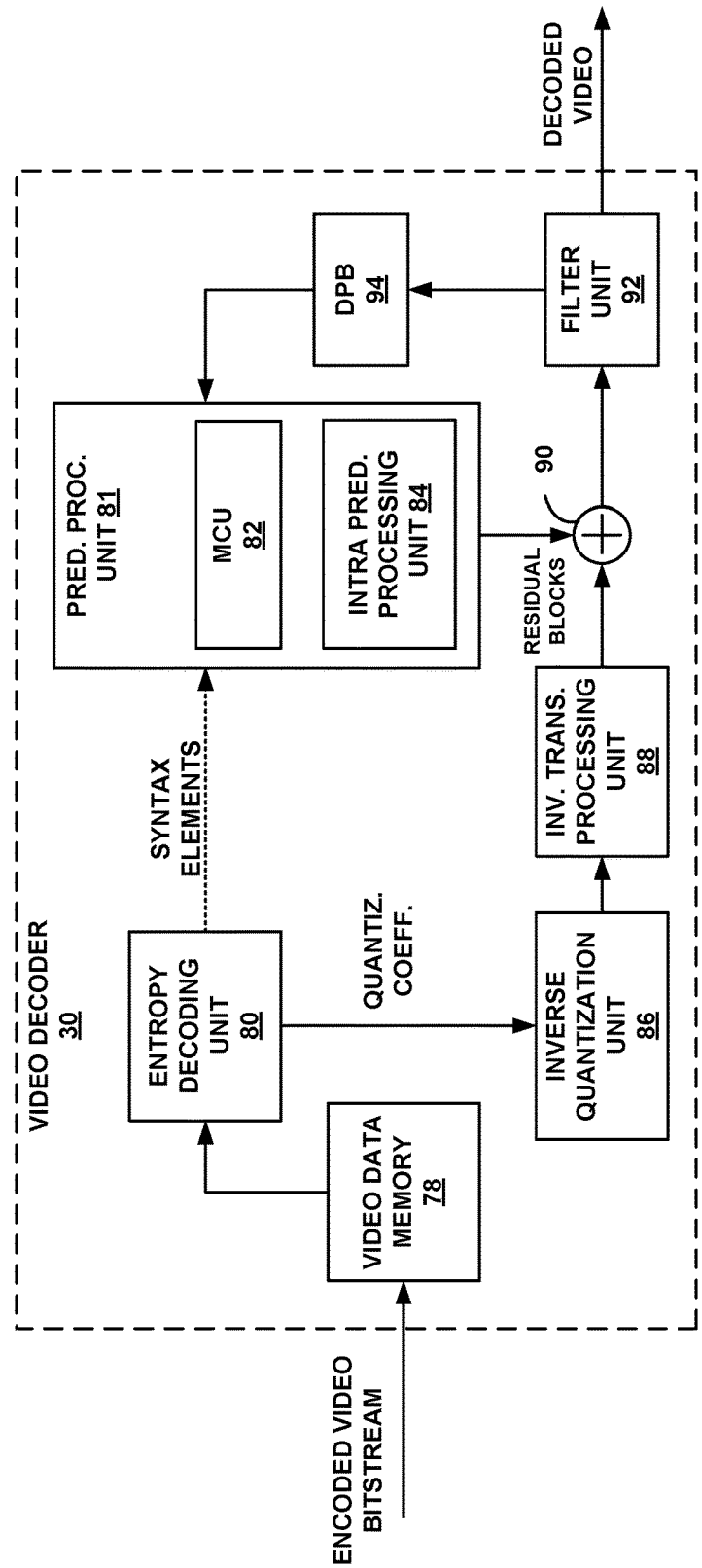
FIG. 5 is a block diagram illustrating an example video decoder that may implement the techniques described in this disclosure.

FIG. 5 is a block diagram illustrating an example video decoder 30 that may decode encoded video data according to the techniques described in this disclosure. Although video decoder 30 is presented as a video decoder configured to receive and decode video data, it should be understood that many of the techniques described with respect to video decoder 30 may also be performed by video encoder 20 or 21. Video encoders 20 and 21 may, for example, include a video decoding loop, and as part of performing multiple coding passes, video encoders 20 and 21 may encode video data and then decode the encoded video data in order to analyze the quality of the encoding.

In the example of FIG. 5, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 3A or video encoder 21 from FIG. 3B.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16 of FIG. 1, from storage device 26 of FIG. 1, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. Filter unit 92 filters the reconstructed video block using, for example, one or more of deblocking filtering, SAO filtering, ALF filtering, or other types of filtering. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 6:
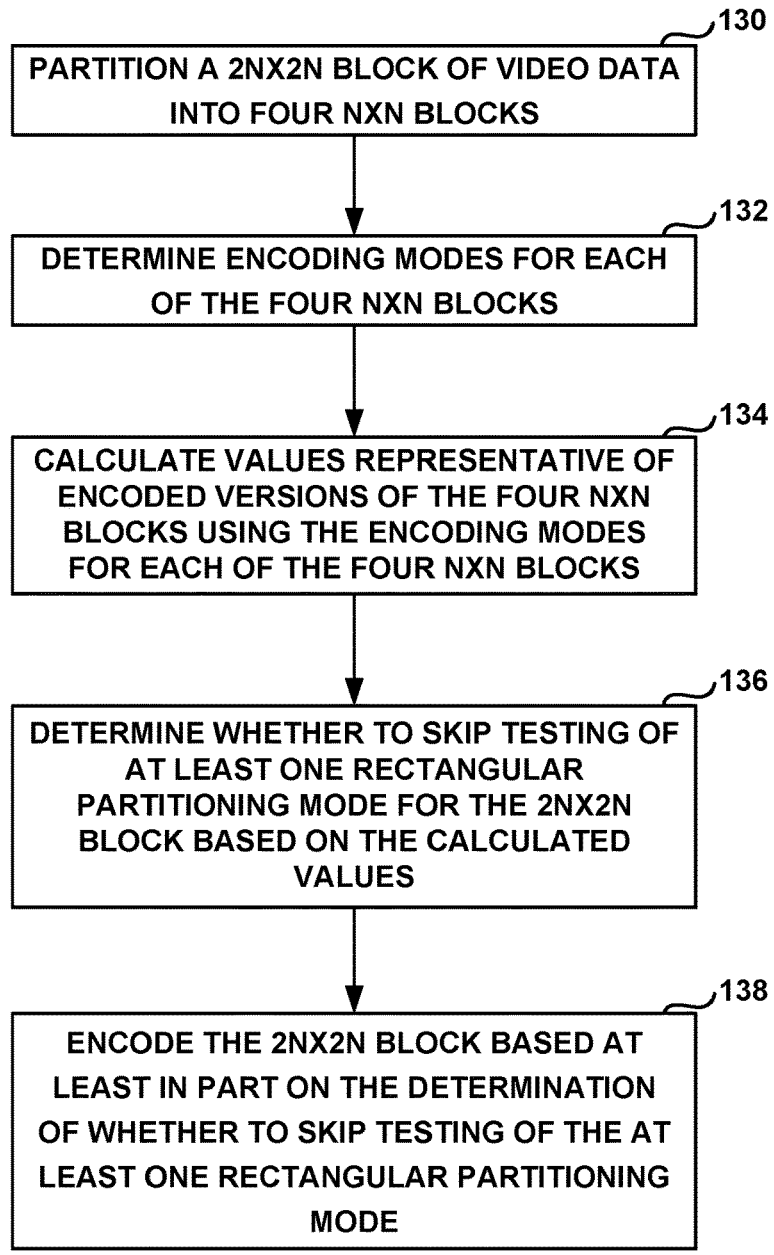
FIG. 6 shows a flowchart illustrating techniques for rectangular PU optimization in accordance with aspects of this disclosure.

FIG. 6 shows a flowchart illustrating techniques for rectangular PU optimization in accordance with aspects of this disclosure. The techniques of FIG. 6 will be described with respect to a generic video encoder, which may correspond to either video encoders 20 and 21, combine characteristics of both video encoders 20 and 21, and/or be different than video encoder 20 and 21. The techniques of FIG. 6 are not limited to any particular type of video encoder.

The video encoder partitions a 2N×2N block of video data into four N×N blocks (130). The video encoder determines encoding modes for each of the four N×N blocks (132) and calculates values representative of encoded versions of the four N×N blocks using the encoding modes for each of the four N×N blocks (134). The video encoders determines whether to skip testing of at least one rectangular partitioning mode for the 2N×2N block based on the calculated values (136). The video encoder encodes the 2N×2N block based at least in part on the determination of whether to skip testing of the at least one rectangular partitioning mode (138). The video encoder, for examples, selects a partition mode from among the various partition modes that are tested and encodes the 2N×2N block using the selected partition mode.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    partitioning a 2N×2N block of video data into four N×N blocks, wherein N is an integer value, and wherein the four N×N blocks comprise an upper-left block, an upper-right block, a lower-left block, and a lower-right block;
    determining encoding modes for each of the four N×N blocks;
    calculating values representative of encoded versions of the four N×N blocks using the encoding modes for each of the four N×N blocks;
    determining whether to skip testing of at least one non-square partitioning mode for the 2N×2N block based on the calculated values;
    selecting a partitioning mode for the 2N×2N block based at least in part on the determination of whether to skip testing of the at least one non-square partitioning mode; and
    encoding the 2N×2N block according to the selected partitioning mode.

2. The method of claim 1, wherein determining whether to skip testing comprises:
    determining a horizontal value from the values representative of the encoded versions of the four N×N blocks, wherein the horizontal value comprises a difference between values representative of encoded versions of the upper-left and upper-right blocks and values representative of encoded versions of the lower-left and lower-right blocks;
    determining a vertical value from the values representative of the encoded versions of the four N×N blocks, wherein the vertical value comprises a difference between values representative of encoded versions of the top-left and bottom-left blocks and values representative of encoded versions of the top-right and bottom-right blocks; and
    determining whether to skip testing of the at least one non-square partitioning mode based on whether the horizontal value is larger than the vertical value multiplied by an offset or whether the vertical value is larger than the horizontal value multiplied by the offset.

3. The method of claim 2, wherein determining whether to skip testing comprises determining to skip testing an N×2N partitioning mode when the horizontal value is larger than the vertical value multiplied by the offset.

4. The method of claim 2, wherein determining whether to skip testing comprises determining to skip testing a 2N×N partitioning mode when the vertical value is larger than the horizontal value multiplied by the offset.

5. The method of claim 2,
    wherein calculating the values comprises calculating motion vector difference values for motion vectors of the four N×N blocks, each of the motion vector difference values including a respective horizontal component and a respective vertical component,
    wherein determining the horizontal value comprises calculating the sum of a first difference between the horizontal component of the motion vector for the upper-left block of the four N×N blocks and the horizontal component of the motion vector for the upper-right block of the four N×N blocks and a second difference between the horizontal component of the motion vector for the lower-left block of the four N×N blocks and the horizontal component of the motion vector for the lower-right block of the four N×N blocks, and
    wherein determining the horizontal value comprises calculating the sum of a first difference between the horizontal component of the motion vector for the upper-left block of the four N×N blocks and the horizontal component of the motion vector for the upper-right block of the four N×N blocks and a second difference between the horizontal component of the motion vector for the lower-left block of the four N×N blocks and the horizontal component of the motion vector for the lower-right block of the four N×N blocks.

6. The method of claim 2, wherein determining the horizontal value from the values representative of the encoded versions of the four N×N blocks and determining the vertical value from the values representative of the encoded versions of the four N×N blocks is performed in response to a first rate-distortion (RD) cost associated with encoding block of video data in a 2N×2N partition mode being greater than a second RD cost associated with encoding the block of video data in an N×N partition mode.

7. The method of claim 2, wherein determining the horizontal value from the values representative of the encoded versions of the four N×N blocks and determining the vertical value from the values representative of the encoded versions of the four N×N blocks is performed in response to determining not to encode the 2N×2N block using an intra mode for any of the four N×N blocks.

8. The method of claim 2, further comprising:
    in response to the horizontal value being less than the vertical value multiplied by the offset and the vertical value being less than the horizontal value multiplied by the offset, testing both the N×2N partitioning mode and the 2N×N partitioning mode.

9. A device for encoding video data, the device comprising:
a memory configured to store the video data; and
one or more processors configured to:
partition a 2N×2N block of video data into four N×N blocks, wherein N is an integer value, and wherein the four N×N blocks comprise an upper-left block, an upper-right block, a lower-left block, and a lower-right block;
determine encoding modes for each of the four N×N blocks;
calculate values representative of encoded versions of the four N×N blocks using the encoding modes for each of the four N×N blocks;
determine whether to skip testing of at least one non-square partitioning mode for the 2N×2N block based on the calculated values;
select a partitioning mode for the 2N×2N block based at least in part on the determination of whether to skip testing of the at least one non-square partitioning mode; and
encode the 2N×2N block according to the selected partitioning mode.

10. The device of claim 9, wherein to determine whether to skip testing, the one or more processors are further configured to:
determine a horizontal value from the values representative of the encoded versions of the four N×N blocks, wherein the horizontal value comprises a difference between values representative of encoded versions of the upper-left and upper-right blocks and values representative of encoded versions of the lower-left and lower-right blocks;
determine a vertical value from the values representative of the encoded versions of the four N×N blocks, wherein the vertical value comprises a difference between values representative of encoded versions of the top-left and bottom-left blocks and values representative of encoded versions of the top-right and bottom-right blocks; and
determine whether to skip testing of the at least one non-square partitioning mode based on whether the horizontal value is larger than the vertical value multiplied by an offset or whether the vertical value is larger than the horizontal value multiplied by the offset.

11. The device of claim 10, wherein to determine whether to skip testing, the one or more processors are further configured to determine to skip testing an N×2N partitioning mode when the horizontal value is larger than the vertical value multiplied by the offset.

12. The device of claim 10, wherein to determine whether to skip testing, the one or more processors are further configured to determine to skip testing a 2N×N partitioning mode when the vertical value is larger than the horizontal value multiplied by the offset.

13. The device of claim 10,
wherein to calculate the values, the one or more processors are further configured to calculate motion vector difference values for motion vectors of the four N×N blocks, each of the motion vector difference values including a respective horizontal component and a respective vertical component,
wherein to determine the horizontal value, the one or more processors are further configured to calculate the sum of a first difference between the horizontal component of the motion vector for the upper-left block of the four N×N blocks and the horizontal component of the motion vector for the upper-right block of the four N×N blocks and a second difference between the horizontal component of the motion vector for the lower-left block of the four N×N blocks and the horizontal component of the motion vector for the lower-right block of the four N×N blocks, and
wherein to determine the horizontal value, the one or more processors are further configured to calculate the sum of a first difference between the horizontal component of the motion vector for the upper-left block of the four N×N blocks and the horizontal component of the motion vector for the upper-right block of the four N×N blocks and a second difference between the horizontal component of the motion vector for the lower-left block of the four N×N blocks and the horizontal component of the motion vector for the lower-right block of the four N×N blocks.

14. The device of claim 10, wherein the one or more processors are further configured to determine the horizontal value from the values representative of the encoded versions of the four N×N blocks and determine the vertical value from the values representative of the encoded versions of the four N×N blocks in response to a first rate-distortion (RD) cost associated with encoding block of video data in a 2N×2N partition mode being greater than a second RD cost associated with encoding the block of video data in an N×N partition mode.

15. The device of claim 10, wherein the one or more processors are further configured to determine the horizontal value from the values representative of the encoded versions of the four N×N blocks and determine the vertical value from the values representative of the encoded versions of the four N×N blocks in response to determining not to encode the 2N×2N block using an intra mode for any of the four N×N blocks.

16. The device of claim 10, wherein the one or more processors are further configured to test both the N×2N partitioning mode and the 2N×N partitioning mode in response to the horizontal value being less than the vertical value multiplied by the offset and the vertical value being less than the horizontal value multiplied by the offset.

17. The device of claim 10, wherein the device comprises a wireless communication device comprising a transmitter configured to transmit encoded data.

18. The device of claim 17, wherein the wireless communication device comprises a cellular telephone and the encoded video data is modulated according to a cellular communication standard prior to being transmitted by the transmitter.

19. An apparatus for encoding video data, the apparatus comprising:
means for partitioning a 2N×2N block of video data into four N×N blocks, wherein N is an integer value, wherein the four N×N blocks comprise an upper-left block, an upper-right block, a lower-left block, and a lower-right block;
means for determining encoding modes for each of the four N×N blocks;
means for calculating values representative of encoded versions of the four N×N blocks using the encoding modes for each of the four N×N blocks;
means for determining whether to skip testing of at least one non-square partitioning mode for the 2N×2N block based on the calculated values;

means for selecting a partitioning mode for the 2N×2N block based at least in part on the determination of whether to skip testing of the at least one non-square partitioning mode; and means for encoding the 2N×2N block according to the selected partitioning mode.

20. The apparatus of claim 19, wherein the means for determining whether to skip testing comprises:

means for determining a horizontal value from the values representative of the encoded versions of the four N×N blocks, wherein the horizontal value comprises a difference between values representative of encoded versions of the upper-left and upper-right blocks and values representative of encoded versions of the lower-left and lower-right blocks;

means for determining a vertical value from the values representative of the encoded versions of the four N×N blocks, and wherein the vertical value comprises a difference between values representative of encoded versions of the top-left and bottom-left blocks and values representative of encoded versions of the top-right and bottom-right blocks; and means for determining whether to skip testing of the at least one non-square partitioning mode based on whether the horizontal value is larger than the vertical value multiplied by an offset or whether the vertical value is larger than the horizontal value multiplied by the offset.

21. The apparatus for claim 20, wherein the means for determining whether to skip testing comprises means for determining to skip testing an N×2N partitioning mode when the horizontal value is larger than the vertical value multiplied by the offset.

22. The apparatus for claim 20, wherein the means for determining whether to skip testing comprises means for determining to skip testing a 2N×N partitioning mode when the vertical value is larger than the horizontal value multiplied by the offset.

23. The apparatus for claim 20, wherein the means for calculating the values comprises means for calculating motion vector difference values for motion vectors of the four N×N blocks, each of the motion vector difference values including a respective horizontal component and a respective vertical component, wherein the means for determining the horizontal value comprises means for calculating the sum of a first difference between the horizontal component of the motion vector for the upper-left block of the four N×N blocks and the horizontal component of the motion vector for the upper-right block of the four N×N blocks and a second difference between the horizontal component of the motion vector for the lower-left block of the four N×N blocks and the horizontal component of the motion vector for the lower-right block of the four N×N blocks, and wherein the means for determining the horizontal value comprises means for calculating the sum of a first difference between the horizontal component of the motion vector for the upper-left block of the four N×N blocks and the horizontal component of the motion vector for the upper-right block of the four N×N blocks and a second difference between the horizontal component of the motion vector for the lower-left block of the four N×N blocks and the horizontal component of the motion vector for the lower-right block of the four N×N blocks.

24. The apparatus for claim 20, wherein the means for determining the horizontal value from the values representative of the encoded versions of the four N×N blocks and the means for determining the vertical value from the values representative of the encoded versions of the four N×N blocks perform in response to a first rate-distortion (RD) cost associated with encoding block of video data in a 2N×2N partition mode being greater than a second RD cost associated with encoding the block of video data in an N×N partition mode.

25. A non-transitory computer-readable storage medium storing instructions that when executed by one or more processors cause the one or more processors to:

partition a 2N×2N block of video data into four N×N blocks, wherein N is an integer value, and wherein the four N×N blocks comprise an upper-left block, an upper-right block, a lower-left block, and a lower-right block;

determine encoding modes for each of the four N×N blocks;

calculate values representative of encoded versions of the four N×N blocks using the encoding modes for each of the four N×N blocks;

determine whether to skip testing of at least one non-square partitioning mode for the 2N×2N block based on the calculated values;

select a partitioning mode for the 2N×2N block based at least in part on the determination of whether to skip testing of the at least one non-square partitioning mode; and encode the 2N×2N block according to the selected partitioning mode.

26. The non-transitory computer-readable storage medium of claim 25, wherein to determine whether to skip testing, the computer-readable storage medium stores further instructions that when executed cause the one or more processors to:

determine a horizontal value from the values representative of the encoded versions of the four N×N blocks, wherein the horizontal value comprises a difference between values representative of encoded versions of the upper-left and upper-right blocks and values representative of encoded versions of the lower-left and lower-right blocks;

determine a vertical value from the values representative of the encoded versions of the four N×N blocks, wherein the vertical value comprises a difference between values representative of encoded versions of the top-left and bottom-left blocks and values representative of encoded versions of the top-right and bottom-right blocks; and determine whether to skip testing of the at least one non-square partitioning mode based on whether the horizontal value is larger than the vertical value multiplied by an offset or whether the vertical value is larger than the horizontal value multiplied by the offset.

27. The non-transitory computer-readable storage medium of claim 26, wherein to determine whether to skip testing, the computer-readable storage medium stores further instructions that when executed cause the one or more processors to determine to skip testing an N×2N partitioning mode when the horizontal value is larger than the vertical value multiplied by the offset.

28. The non-transitory computer-readable storage medium of claim 26, wherein to determine whether to skip testing, the computer-readable storage medium stores further instructions that when executed cause the one or more processors to determine to skip testing a 2N×N partitioning mode when the vertical value is larger than the horizontal value multiplied by the offset.

29. The non-transitory computer-readable storage medium of claim 26,
  wherein to calculate the values, the computer-readable storage medium stores further instructions that when executed cause the one or more processors to calculate motion vector difference values for motion vectors of the four N×N blocks, each of the motion vector difference values including a respective horizontal component and a respective vertical component,
  wherein to determine the horizontal value, the computer-readable storage medium stores further instructions that when executed cause the one or more processors to calculate the sum of a first difference between the horizontal component of the motion vector for the upper-left block of the four N×N blocks and the horizontal component of the motion vector for the upper-right block of the four N×N blocks and a second difference between the horizontal component of the motion vector for the lower-left block of the four N×N blocks and the horizontal component of the motion vector for the lower-right block of the four N×N blocks, and
  wherein to determine the horizontal value, the computer-readable storage medium stores further instructions that when executed cause the one or more processors to calculate the sum of a first difference between the horizontal component of the motion vector for the upper-left block of the four N×N blocks and the horizontal component of the motion vector for the upper-right block of the four N×N blocks and a second difference between the horizontal component of the motion vector for the lower-left block of the four N×N blocks and the horizontal component of the motion vector for the lower-right block of the four N×N blocks.

30. The non-transitory computer-readable storage medium of claim 26, wherein the computer-readable storage medium stores further instructions that when executed cause the one or more processors to determine the horizontal value from the values representative of the encoded versions of the four N×N blocks and to determine the vertical value from the values representative of the encoded versions of the four N×N blocks in response to a first rate-distortion (RD) cost associated with encoding block of video data in a 2N×2N partition mode being greater than a second RD cost associated with encoding the block of video data in an N×N partition mode.

* * * * *